(12) United States Patent
Rosenberg et al.

(10) Patent No.: US 6,203,212 B1
(45) Date of Patent: Mar. 20, 2001

(54) OPTICAL SUBASSEMBLY FOR USE IN FIBER OPTIC DATA TRANSMISSION AND RECEPTION

(75) Inventors: Paul K. Rosenberg, Sunnyvale; Albert T. Yuen, Los Altos; Kirk S. Giboney, Mountain View, all of CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/138,827

(22) Filed: Aug. 24, 1998

(51) Int. Cl.[7] .................. G02B 6/36; G02B 6/30
(52) U.S. Cl. .................. 385/92; 385/88; 385/49
(58) Field of Search ................ 385/12–14, 88–94

(56) References Cited

U.S. PATENT DOCUMENTS

| | | | |
|---|---|---|---|
| 5,264,392 | 11/1993 | Gaebe et al. | 437/209 |
| 5,475,783 | * 12/1995 | Kurashima | 385/92 |
| 5,537,504 | 7/1996 | Cina et al. | 385/93 |
| 5,550,941 | 8/1996 | Lebby et al. | 385/49 |
| 5,590,232 | * 12/1996 | Wentworth et al. | 385/92 |
| 5,737,133 | * 4/1998 | Ouchi et al. | 385/92 |
| 5,737,465 | * 4/1998 | Okochi | 385/92 |
| 5,943,461 | * 8/1999 | Shahid | 385/92 |

* cited by examiner

Primary Examiner—Thong Nguyen

(57) ABSTRACT

An optical subassembly and a method of fabricating the same utilize a subassembly body that is formed by molding the subassembly body onto a substrate. Preferably, the subassembly body is constructed of a plastic material that can be molded into a precise shape. The subassembly body and the substrate become an integral unit when the molded plastic material is polymerized. The optical subassembly includes the subassembly body, the substrate, an optical element, an optoelectronic device, and a transmitter or receiver integrated circuit (IC) chip. The optoelectronic device and the transmitter/receiver IC chip are affixed to the substrate. Preferably, the substrate is a flexible circuit having a number of electrical traces. The flexible circuit may be composed of a polymer material. The optoelectronic device is positioned on the substrate such that the optoelectronic device is located within an opening in the subassembly body. The opening may become an enclosed cavity when the optical element is attached to the subassembly body.

16 Claims, 3 Drawing Sheets

OPTICAL SUBASSEMBLY FOR USE IN FIBER OPTIC DATA TRANSMISSION AND RECEPTION

TECHNICAL FIELD

The invention relates generally to fiber optic devices and more particularly to an optical subassembly for use in fiber optical systems.

DESCRIPTION OF THE RELATED ART

When manufacturing a fiber optic device for interconnecting optical fibers, it may be beneficial to fabricate a portion of the device as an optical subassembly, which can be tested as a separate unit. For example, the optical subassembly may include a semiconductor light source or photodetector, and other optical components. If the optical subassembly is a transmission type, a semiconductor light source will typically be included in the optical subassembly. On the other hand, if the optical subassembly is a reception type, the optical subassembly will include a photodetector.

One major type of optical subassembly utilizes a transistor outline (TO) can package containing a semiconductor light source or a photodetector. An optical subassembly utilizing a TO can package is described in U.S. Pat. No. 5,537,504 to Cina et al. The optical subassembly of Cina et al. includes a molded plastic housing having a TO can package attached to one end of the housing. Epoxy type adhesive is used to attach the housing to the TO can package. The optical subassembly of Cina et al. also includes a lens that is placed within the molded plastic housing between the TO can package and an optical fiber.

A concern with optical subassemblies utilizing a TO can package is that TO can packages are relatively expensive. In addition, TO can packages do not typically accommodate a high density of electrical inputs and outputs, and are not compatible with most commercially available high-speed semiconductor assembly equipment. Furthermore, TO cans are bulk and result in electrical parasitics (e.g. capacitance, resistance, inductance) that limit the high-speed performance of such packages.

Another major type of optical subassembly utilizes a submount, e.g., a micro-machined silicon micro-bench, to support an optoelectronic device and other optical components. The submount is typically a semiconductor substrate having a number of etched depressions for affixing the device and components onto the submount. U.S. Pat. No. 5,264,392 to Gaebe et al. describes an optical subassembly having a silicon-based submount. The submount supports a cylindrically-shaped graded-index (GRIN) lens, an optical isolator, an optoelectronic device, and a spherical lens.

A concern with optical subassemblies utilizing a submount is that, similar to the TO can type optical subassemblies, submounts are generally expensive. In addition, quality material for fabrication of the submounts is presently available from only a limited number of vendors.

While known optical subassemblies operate well for their intended purposes, improvements in performance and reduction in fabrication cost are desired. In particular, low cost package designs which permit the assembly of multiple optical sources or detectors in a small volume are needed.

SUMMARY OF THE INVENTION

An optical subassembly and a method of fabricating the same utilize a subassembly body that is formed by molding the subassembly body onto a substrate. Preferably, the subassembly body is formed of a polymeric material that can be molded into a precise shape directly onto the substrate. The subassembly body and the substrate become an integral unit when the molded polymeric material is polymerized.

In a first embodiment of the invention, the optical subassembly facilitates transmission or reception of light signals that are propagating exclusively in a single plane. The optical subassembly of the first embodiment includes an optical element, the subassembly body, the substrate, an optoelectronic device, and a transmitter or receiver integrated circuit (IC) chip. As stated above, the subassembly body and the substrate form an integral unit. The other components are attached to the integral unit. The optoelectronic device and the transmitter/receiver IC chip may be affixed to substrate, while the optical element is affixed to the molded subassembly body. Preferably, the substrate is a flexible circuit having a number of electrical traces. The flexible circuit may be composed of a polymer material. The optoelectronic device may be a light source and/or detector that is affixed to one side of the flexible circuit, while the transmitter/receiver IC chip is affixed to the opposite side. Alternatively, the transmitter/receiver IC chip may be affixed to the same side of the flexible circuit with respect to the light source and/or detector. The position of the transmitter/receiver IC chip on the flexible circuit is not critical to the invention. The optoelectronic device is positioned on the substrate such that the optoelectronic device is located within an opening in the subassembly body.

The optoelectronic device and the transmitter/receiver IC chip may be affixed to the substrate using a conductive epoxy, solder, or other comparable material. In addition, the optoelectronic device and the transmitter/receiver IC chip may be electrically connected to the substrate by wire connections or via flip chip contacts. Additional optoelectronic devices and their associated transmitter/receiver IC chips may be affixed to the substrate.

The optical element is preferably attached to the subassembly body. The rearward face of the optical element is positioned such that the opening of the subassembly body containing the optoelectronic device becomes an enclosed cavity that encapsulates the optoelectronic device. The optical element may be one or more lenses or other optics designed to provide an efficient coupling of optical fibers to the optoelectronic device. The optical element may incorporate mechanical stand-offs to ensure that proper spacing is maintained between the optical fibers and the optical element when a fiber optic ribbon cable is attached to the optical subassembly.

A second embodiment of the invention includes the same components of the optical subassembly as the first embodiment of the invention, but with a different configuration of the optical element, the subassembly body, and the substrate. The configuration of the optical subassembly in accordance with the second embodiment is primarily designed to accommodate light signals that are emitted or received in a first direction by the optoelectronic device. However, the light signals are transmitted to or received from optical fibers in a direction that is perpendicular to the first direction. This is rendered possible by an optical element which provides a 90 degree optical turn for light signals in order to redirect horizontally propagating light signals from the optical fibers into a vertical direction, or direct vertically propagating lights signals from the optoelectronic device into a horizontal direction. The optical element may include optical guiding veins or channels to change the propagating direction of lights signals.

To facilitate the change in the propagating direction of light signals, the subassembly body is configured such that the optical element is attached to the forward face of the subassembly body, while the substrate is located at the bottom of the subassembly body. The optoelectronic device is affixed to the substrate to receive or emit light signals in a vertical direction. In the second embodiment, the optoelectronic device and the transmitter/receiver IC chip are affixed to the same side of the substrate. However, the location of the transmitter/receiver IC chip on the substrate is not critical to the invention. Similar to the first embodiment, additional optoelectronic devices and their associated transmitter/receiver IC chips may be affixed to the substrate to couple more optical fibers.

A method of fabricating an optical subassembly in accordance with the invention initially involves a step in which a substrate having electrical traces is provided. The substrate can be provided in a panel form to fabricate a number of the optical subassemblies in a parallel fabrication manner. Preferably, the substrate is a flexible circuit containing sufficient circuitry to accommodate a number of optoelectronic devices and their associated transmitter/receiver IC chips. Next, a subassembly body is formed on the substrate by a molding process. The molding process may involve transfer molding or injection molding thermoplastic resin onto the substrate. Preferably, the substrate includes holes through which the plastic material flows during this step, allowing the subassembly body to become integrally bonded to both sides of the substrate, such that the subassembly body and the substrate become an integrated unit.

The subassembly body may be formed to include mechanical features and indentations. The mechanical features can be used to align an optoelectronic device and an optical element with respect to the subassembly body. The indentations allow the optical subassembly, when fully assembled, to be attached to a housing of a comprehensive fiber optic device.

After the subassembly body is molded onto the substrate, an optoelectronic device and a transmitter/receiver IC chip are physically affixed and electrically connected to the substrate. The optoelectronic device and the transmitter/receiver IC chip may be affixed to the substrate using a conductive epoxy or solder materials. This electrical connection step may involve wire connections or flip chip contacts. Next, an optical element can be attached to the subassembly body.

An advantage of the present invention is the low cost of manufacturing the optical subassembly in accordance with the present invention by utilizing an inexpensive molding process to form the subassembly body. In addition, the use of the molding process provides a subassembly body having high precision dimensions that may be utilized to align an optical element to the optoelectronic device.

Another advantage is that the substrate permits optoelectronic devices and their associated transmitter/receiver IC chips to be placed in close proximity. The close proximity reduces the length of electrical traces connecting the optoelectronic devices and the transmitter/receiver IC chips. The decrease in the length of electrical traces translates to increasing the bandwidth of a device utilizing the optical subassembly in accordance with the invention.

Still another advantage of the present invention is that mechanical strain relief is provided for electrical contacts, e.g., solder or conductive epoxy contacts, between the optical subassembly and a secondary circuit board. The use of flexible circuit as the substrate virtually eliminates stresses that are typically transferred to the electrical contacts by insertion or extraction of a connectorized fiber optic ribbon cable.

Still another advantage relates to the ease of fabricating the optical subassemblies using the panel form. By fabricating the optical subassemblies in the panel form, manufacturing cost can be lowered. In addition, standard high-speed semiconductor assembly equipment can be utilized in the fabrication process.

Still another advantage is that assembling the optical element to the subassembly body can provide a sealed cavity that encapsulates the optoelectronic devices without adding a costly step of over-molding or glob topping to the manufacturing process. The sealed cavity provides environmental protection for the optoelectronic devices during the life of the product.

DETAILED DESCRIPTION

Figure 1:
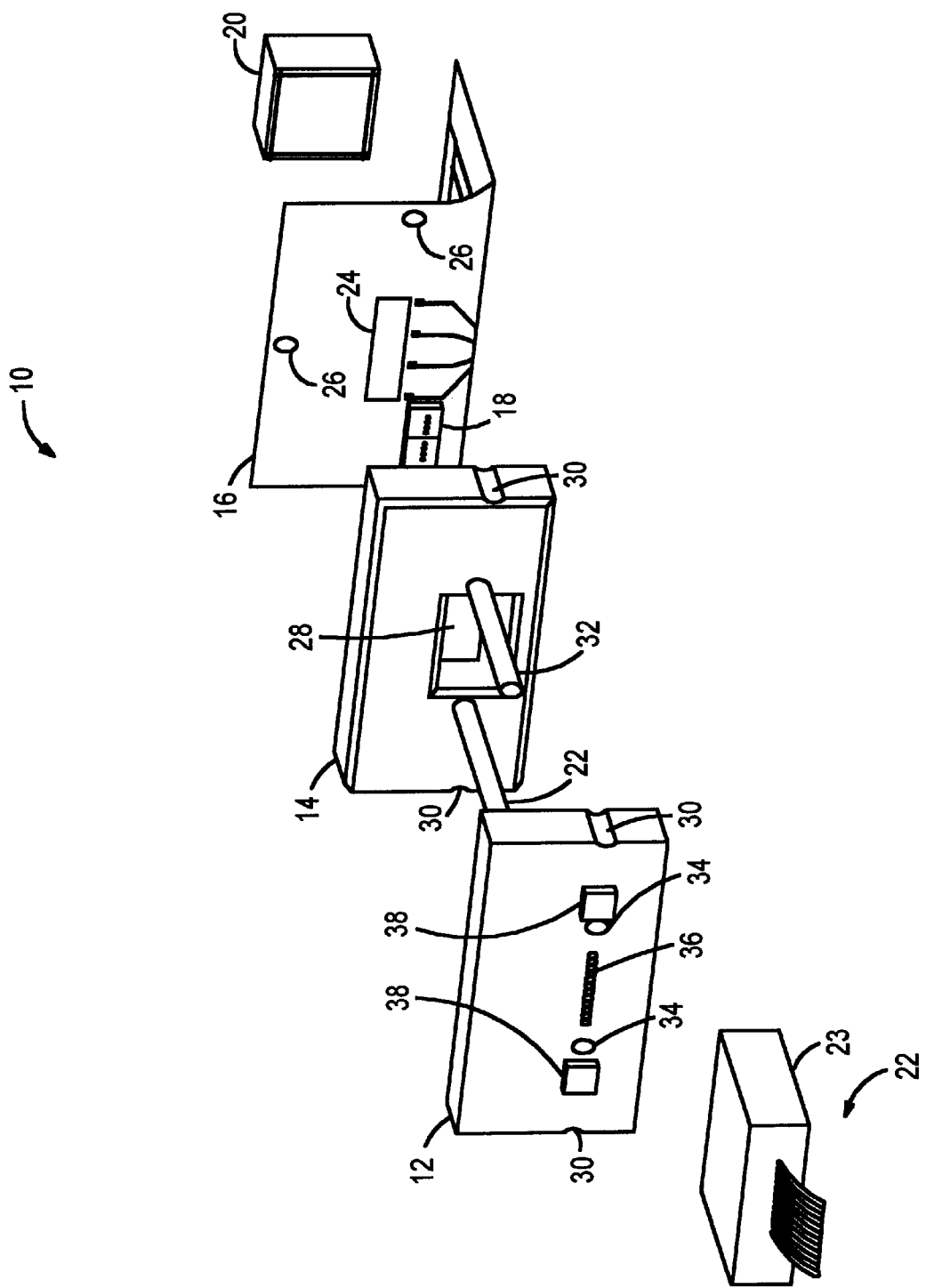
FIG. 1 is a perspective illustration of an optical subassembly in accordance with a first embodiment of the present invention.

With reference to FIG. 1, an optical subassembly 10 in accordance with a first embodiment of the invention is shown. The components of the optical subassembly 10 are illustrated apart from each other in order to distinguish each component. The optical subassembly 10 may be utilized in a number of different environments involving interconnection of optical fibers. For example, the optical subassembly 10 may be utilized in telecommunication switching systems. The optical subassembly 10 may also be utilized in computer clusters in local networks.

The optical subassembly 10 includes an optical element 12, a subassembly body 14, a flexible circuit 16, an optoelectronic device 18, and a transmitter/receiver integrated circuit (IC) chip 20. The optical subassembly 10 is configured to transmit or receive light signals to or from an array of optical fibers 22 that are positioned in a fiber holder 23. The array of optical fibers 22 and the fiber holder 23 may represent a connectorized fiber optic cable. The ability of the optical subassembly 10 to transmit or receive light signals primarily depends on the type of optoelectronic device 18 utilized in the optical subassembly 10. The optoelectronic device 18 may be a semiconductor photodetector. On the other hand, the optoelectronic device 18 may be a semiconductor light source such as a laser or a light emitting diode (LED). Alternatively, the optoelectronic device may be comprised of multiple light sources and/or receivers.

The transmitter/receiver IC chip 20 may be configured to process various signal transmission or reception functions, depending on the type of optoelectronic device 18 utilized by the optical subassembly 10. Preferably, the transmitter/receiver IC chip 20 is positioned in close proximity to the optoelectronic device 18 on the flexible circuit 16, requiring short conductive traces on the flexible circuit 16 to electrically connect the optoelectronic device 18 and the transmitter/receiver IC chip 20. The physical proximity of the optoelectronic device 18 and the transmitter/receiver IC chip 20 minimizes parasitic electrical signals, maximizing data rate. In this embodiment, the optoelectronic device 18 is affixed to one side of the flexible circuit 16, while the transmitter/receiver IC chip 20 is affixed to the other side of the flexible circuit 16. However, the optoelectronic device 18 and the transmitter/receiver IC chip 20 may be affixed to the same side of the flexible circuit 16.

The flexible circuit 16 may be composed of a polymer material. The flexible circuit 16 is shown as having a rectangular area 24 on the forward side. The rectangular area 24 is configured to accommodate the optoelectronic device 18. The optoelectronic device 18 may be bonded onto the flexible circuit 16 on the rectangular area 24 by utilizing conventional conductive epoxy or solder material. Electrical connections between electronic device 18 and the flexible circuit 16 may be made by wire connections or via flip chip contacts. The transmitter/receiver IC chip 20 bonded and electrically connected to the flexible circuit 16 in a similar manner. Although a single optoelectronic device and a single transmitter/receiver IC chip are shown in FIG. 1, additional optoelectronic devices and IC chips may be included in the optical subassembly 10.

The flexible circuit 16 includes three circular holes 26. In FIG. 1, only two holes 26 are visible because the subassembly body 14 is blocking the view of the third hole. While not critical to the invention, the holes 26 provide greater adherence between the subassembly body 14 and the flexible circuit 16. As will be described in detail below, the subassembly body 14 is molded onto the flexible circuit 16. The subassembly body 14 is composed of a plastic material. The holes 26 in the flexible circuit 16 allow the plastic material to flow to the rearward side of the flexible circuit 16 during the molding process. When set, the plastic material anchors the subassembly body 14 to the flexible circuit 16. The anchoring will provide a more secure attachment of the subassembly body 14 to the flexible circuit 16.

The molding process may involve transfer molding thermoset resin or injection molding thermoplastic resin onto the substrate 16. The molded subassembly body 14 includes a large square opening 28. The square opening 28 is aligned such that the optoelectronic device 18 fits within the opening. The square opening 28 provides a conduit for light signals to propagate between the optical fibers of the fiber array 22 and the optoelectronic device 18. In addition, the square opening 28 provides a semi-hermetic cavity that encapsulates and environmentally protects the optoelectronic device 18, when sealed by the rearward face of the optical element 12.

The subassembly body 14 includes two indentations 30 on the sides of the subassembly body 14. The indentations 30 provide a means to attach the optical subassembly 10 to a housing of a comprehensive fiber optic device. The optical element 12 has identical indentations 30 for the same purpose. The subassembly body 14 includes two rods 32, or comparable mechanical features, for physically attaching the optical element 12 onto the subassembly body 14. The optical element 12 includes two circular bores 34, such that when the optical element 12 is coupled to the subassembly body, the rods 32 of the subassembly body 14 are inserted through the bores 34 to secure the optical element 12 to the subassembly body 14. The rods 32 of the subassembly body 14 may have lengths that enable the rods 32 to protrude from the optical element 12 when coupled to the subassembly body 14. The protruding rods 32 can be used to attach the fiber array 22 to the optical subassembly 10.

The optical element 12 of the optical subassembly 10 is shown as having an array of lenses 36. The lenses are fabricated on the optical element 12. The lenses focus light beams propagating between the fiber array 22 and the optoelectronic device 18. The array of lenses 36 is not critical to the invention. Alternatively, the optical element 12 may utilize diffractive optics. In fact, the optical element 12 may be replaced by a fiber face plate consisting of a bundle of small core diameter optical fibers, or a thin piece of glass or comparable material, such as sapphire. As stated above, the optical element 12 includes indentations 30 to secure the optical subassembly 10 to a comprehensive fiber optic device. Lastly, the optical element 12 includes two mechanical stand-offs 38. The stand-offs 38 ensure that a precise spacing is maintained between the optical fibers of the fiber array 22 and the array of lenses 36 for optimal coupling of the optical fibers to the optoelectronic device 18.

In operation, the fiber holder 23 is initially positioned to abut the stand-offs 38 of the optical element 12. The fiber holder 23 includes two bores that are identical in diameter to the bores 34 of the optical element 12. The rods 32 protrude from the optical element and are inserted into the bores on the fiber holder 23, allowing the fiber holder 23 to be precisely positioned against the optical element 12. If the optical subassembly 10 is a transmission type, the optoelectronic device 18 emits light signals. The emitted light signals will propagate through the square opening 28 in the subassembly body 14. Next, the light signals travel through the optical element 12 to the optical fibers of the fiber array 22. The lights signals are focused by the lens array 36, as they propagate through the optical element 12. If the optical subassembly 10 is a reception type, light signals are transmitted to the optical subassembly 10 from the optical fibers of the fiber array 22. The light signals initially travel through optical element 12, being focused by the array of lenses 36. The light signals then propagate through the square opening 28 of the subassembly body 14 to the optoelectronic device 18, i.e., a semiconductor photoreceptor.

Figure 2:
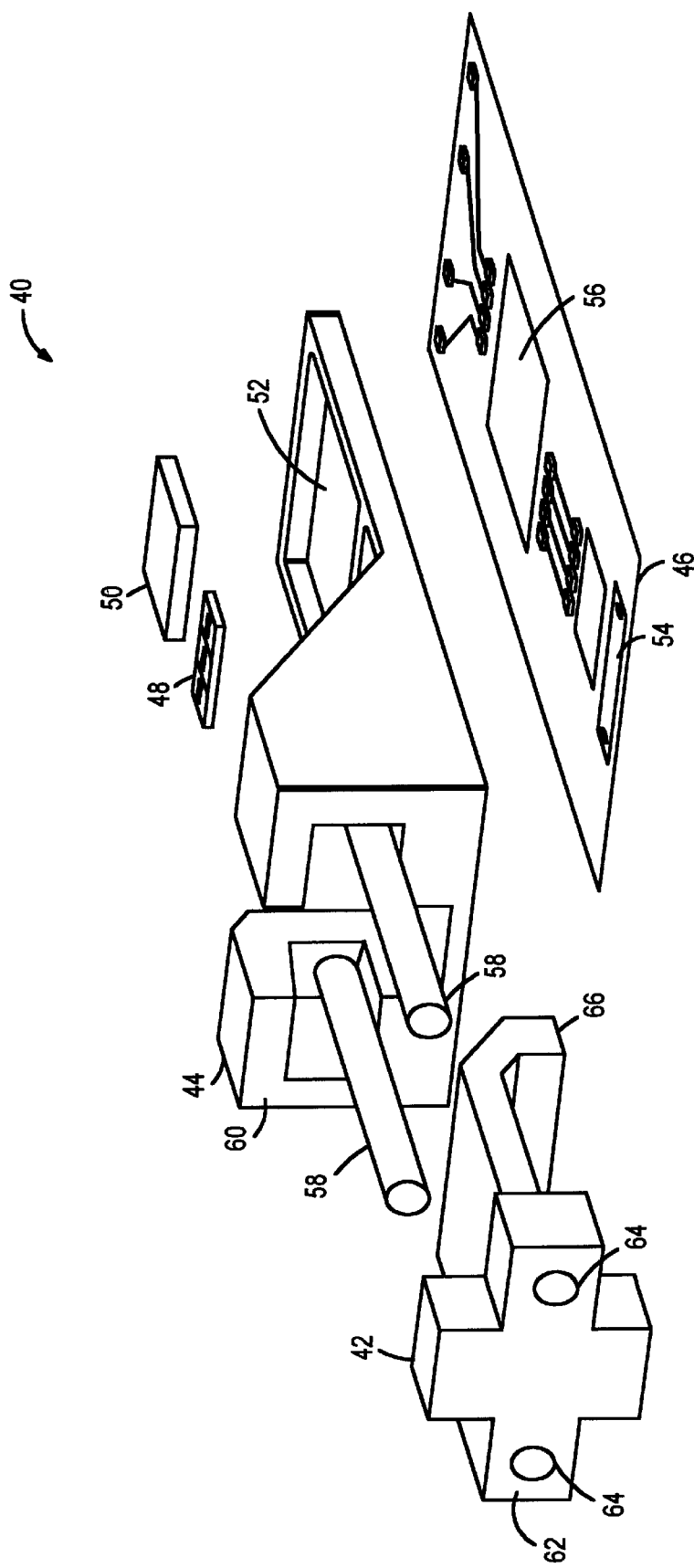
FIG. 2 is a perspective illustration of an optical subassembly in accordance with a second embodiment of the present invention.

Turning to FIG. 2, an optical subassembly 40 in accordance with a second embodiment of the invention is shown. The optical subassembly 40 contains the same components as the optical subassembly 10. However, some of the components of the optical subassembly 40 are configured differently than the components of the optical subassembly 10. The configuration of the optical subassembly 10 of FIG. 1 is used in an application in which light signals propagate in a single plane. In the configuration of the optical subassembly 40, light signals are redirected from one plane to a perpendicular plane. An optical element 42 of the optical subassembly 40 redirects light signals to propagate in a vertical or horizontal direction, depending on whether the optical subassembly 40 is a reception or transmission type. The operation of the optical element 42 will be addressed in detail below.

The optical subassembly 40 further includes a subassembly body 44, a flexible circuit 46, an optoelectronic device 48, and a transmitter/receiver IC chip 50. Identical in function to the subassembly body 14 of the optical subassembly 10, the subassembly body 44 is formed by molding the subassembly body 44 onto the flexible circuit 46. However, the shape of the subassembly body 44 differs from the shape of the subassembly body 14 of FIG. 1. The subassembly body 44 is configured to facilitate a vertical emission or reception of light signals from or to the optoelectronic device 48. In addition, the shape of the subassembly body 44 allows both the optoelectronic device 48 and the transmitter/receiver IC chip 50 to be placed on the same side of the flexible circuit 46. The location of the transmitter/receiver IC chip 50, with respect to the location of the optoelectronic device 48 on the flexible circuit 46, is not critical to the invention. The flexible circuit 46 allows the optoelectronic device 48 and the transmitter/receiver IC chip 50 to be placed in close proximity to one another, which minimizes parasitic electrical signals caused by long electrical connections between an optoelectronic device and its associated transmitter/receiver IC chip(s). Similar to the optoelectronic device 18 of the optical subassembly 10, the optoelectronic device 48 may be a semiconductor light source or a semiconductor photodetector.

The subassembly body 44 is illustrated in FIG. 2 as having two openings. A rectangular opening 52 allows the transmitter/receiver IC chip 50 to be affixed to the flexible circuit 46, after the subassembly body 44 is molded onto the flexible circuit 46. The other opening 53 exposes another area on the flexible circuit 46 in order to attach the optoelectronic device 48 onto the flexible circuit 46. Alternatively, the subassembly body 44 may be configured to have one large opening to facilitate placement of both the optoelectronic device 48 and the transmitter/receiver IC chip 50 onto the flexible circuit 46 within the large opening. The shape(s) and the number of the openings are not critical to the invention. The optoelectronic device 48 is attached to the flexible circuit 46 at the rectangular area 54. Similarly, the transmitter/receiver IC chip 50 is attached to the flexible circuit 46 at the rectangular area 56. In the preferred embodiment, the rectangular areas 54 and 56 are much closer together than illustrated in FIG. 2, such that the optoelectronic device 48 and the transmitter/receiver IC chip 50 may be positioned in close proximity when attached to the flexible circuit 46. The physical attachment and electrical connection of the optoelectronic device 48 and the transmitter/receiver IC chip 50 to the flexible circuit 46 can be accomplished in the same manner as described above in reference to affixing the optoelectronic device 18 and the transmitter/receiver IC chip 20 to the flexible circuit 16.

Similar to the subassembly body 14 of the optical subassembly 10, the subassembly body 44 includes two rods 58 for attaching the optical element 42 onto the subassembly body 44. However, unlike the subassembly body 14, the subassembly body 44 has recesses on the forward face 60 of the subassembly body 44. The recesses allow the optical element 42 to fit into the subassembly body 44. The recesses may be configured to allow the forward face 62 of the optical element 42 to be flush against the forward face 60 of the subassembly body 44, when the optical element 42 is fitted into the subassembly body 44. Although not shown in FIG. 2, the optical element 42 may contain an array of lenses similar to the optical element 12 of the subassembly body 10. In addition, the optical element 42 may include mechanical stand-offs on the forward face 62 to provide proper spacing when optical fibers are placed against the optical element 42.

The optical element 42 includes two bores 64, similar to the bores 34 of the optical element 12. The bores 64 of the optical element 42 allow the rods 58 to be inserted into the optical element 42 to attach the optical element 42 to the subassembly body 44. The optical element 42 also includes an L-shaped section 66. If the optical subassembly 40 is a reception type optical subassembly, the L-shaped section 66 directs horizontally propagating light signals from optical fibers to travel in a vertical direction to the optoelectronic device 48. However, if the optical subassembly 40 is a transmission type optical subassembly, the L-shaped section 66 directs vertically propagating lights signals from the optoelectronic device 48 to travel in a horizontal direction to the optical fibers. The L-shaped section 66 may contain optical guiding veins or channels to direct propagating light signals to or from the optical fibers.

In operation, an array of optical fibers is placed against the optical element 42. The fiber array may be contained in a fiber holder, similar to the fiber holder 23. The fiber holder may contain two bores, such that the rods 58 of the subassembly body 44 may be inserted into the bores of the fiber holder to align the fiber array to the optoelectronic device 48. In a reception type configuration, light signals are transmitted from the fiber array. The light signals initially impinge upon the forward face 62 of the optical element, propagating in a horizontal direction. The horizontally propagating light signals are then directed by the L-shaped section 66 of the optical element 42 to propagate in a vertical direction, down toward the optoelectronic device 48. The light signals are received by the optoelectronic device 48, which would be a photoreceptor. In a transmission type configuration, light signals are emitted from the optoelectronic device 48. In this configuration, the optoelectronic device 48 is a semiconductor light source, such as a laser or a LED. The lights signals initially propagate in a vertical direction to the L-shaped section 66 of the optical element 42. However, the L-shaped section 66 directs the light signals to travel in a horizontal direction. The light signals are then transmitted to the optical fibers in the fiber array.

Figure 3:
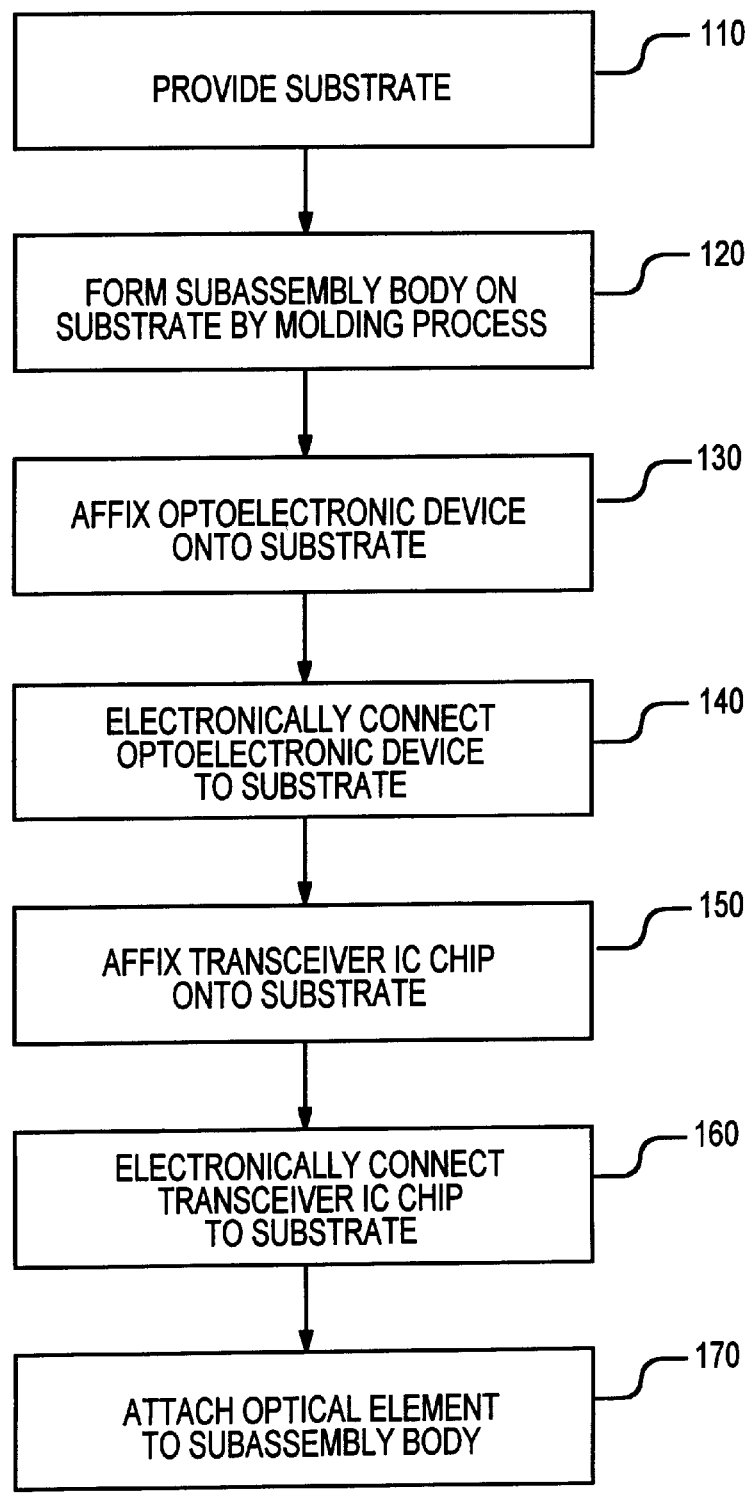
FIG. 3 is a flow diagram of a method of fabricating an optical subassembly in accordance with the present invention.

A method of fabricating an optical subassembly in accordance with the invention will now be described with reference to FIG. 3. At step 110, a substrate having electrical traces is provided. Preferably, the substrate is a flexible circuit containing sufficient circuitry to accommodate a number of optoelectronic devices and their associated transmitter/receiver IC chips. The substrate is preferably provided in a panel form, with multiple units arranged in rows and in close proximity to each other. At step 120, a subassembly body is formed on the substrate by a molding process. The molding process may involve transfer molding thermoset resin or injection molding thermoplastic resin onto the substrate. Preferably, the substrate includes holes for the plastic material to flow through during this step, allowing the subassembly body to become integrally bonded to both sides of the substrate such that the subassembly body and the substrate become an integrated unit.

The subassembly body may be formed to include mechanical features and indentations. The mechanical features can be used to align an optoelectronic device and an optical element with respect to the subassembly body. The indentations allow the optical subassembly, when fully assembled, to be attached to a housing of a comprehensive fiber optic device.

After the subassembly body is molded onto the substrate, an optoelectronic device is affixed to the substrate at step 130. The optoelectronic device may be affixed to the substrate using a conductive epoxy or solder materials. The precise location of the optoelectronic device can be determined by aligning the optoelectronic device with respect to alignment features on the subassembly body using conventional alignment methods, such as vision system or mechanical fixturing. Alternatively, the self-alignment capability inherent in the flip chip integrated chip attachment process may be utilized. At step 140, the optoelectronic device is electrically connected to the substrate. For example, optoelectronic device may be connected by wire connections or via flip chip contacts. Next, at step 150, the transmitter/receiver IC chip is affixed to the substrate. Similar to the step 140, the transmitter/receiver IC chip is electrically connected to the substrate at step 160. At this point, the optoelectronic device and the transmitter/receiver IC chip can be electrically tested, and "burned in" to identify units with potential reliability problems. Defective units may be physically marked and excluded from further processing. Alternatively, the test and "burn in" procedure can occur later in the process.

After affixing the optoelectronic device and the transmitter/receiver IC chip, an optical element can be attached to the subassembly body at step 170. Preferably, the optical element is automatically aligned with respect to the optoelectronic device by the physical attachment of the optical element to the subassembly body. However, the optical element may be aligned with the optoelectronic device by using a vision system incorporating pattern recognition. Alternatively, the optical element may be aligned with the optoelectronic device by using an active alignment process. In this process, power is applied to the optoelectronic device and the position of the optical element is determined by measuring and maximizing optical throughput in the optical subassembly.

What is claimed is:

1. A method of fabricating an optical subassembly comprising steps of:

providing a substrate having a plurality of conductive traces and having at least one structural feature for receiving polymeric material, said conductive traces configured to electronically interconnect at least one optoelectronic device and a supporting circuitry chip;

molding a subassembly body directly onto said substrate by a molding process to pattern said polymeric material into a preselected shape that defines said subassembly body, including directing said polymeric material into said structural feature of said substrate, thereby simultaneously forming said subassembly body and mechanically connecting said subassembly body to said substrate, said polymeric material being molded into said preselected shape to provide a structural integrity of said optical subassembly and to establish a conduit for transmitting light signals to and from a plurality of optical lines; and affixing and electrically connecting said at least one optoelectronic device onto said substrate such that at least one optoelectronic device is housed within said subassembly body, said conduit providing an optical path for said light signals propagating between said optical lines and said at least one optoelectronic device.

2. The method of claim 1 wherein said step of molding said subassembly body includes flowing said polymeric material into said structural feature to integrally link said subassembly body to said substrate such that said subassembly body and said substrate become an integrated unit.

3. The method of claim 1 wherein said step of molding said subassembly body includes a step of conforming said polymeric material to include mechanical alignment features on said subassembly body for optically aligning said at least one optoelectronic device to said subassembly body.

4. The method of claim 1 wherein said step of molding said subassembly body includes a step of fashioning said polymeric material to include attachment features on said subassembly body for physical attachment to a housing of a fiber optic device.

5. The method of claim 1 further comprising a step of affixing and electrically connecting said supporting circuitry chip onto said substrate.

6. The method of claim 1 wherein said step of molding said subassembly body includes employing one of transfer molding techniques and injection molding techniques.

7. The method of claim 6 wherein said step of molding includes using thermoset resin as said polymeric material.

8. An optical subassembly for transmission or reception of light signals comprising:

an optoelectronic device in optical communication with an optical line, said optoelectronic device being one of a light source or a detector;

a substrate having opposed first and second sides, having a plurality of conductive traces electrically attached to said optoelectronic device; and a structural frame encasing said optoelectronic device, said structural frame having an opening for enabling propagation of said light beam between said optical line and said optoelectronic device, said structural frame being molded and integrally formed onto said first side of said substrate, said substrate including openings through which said structural frame extends to said second side of said substrate.

9. The subassembly of claim 8 wherein said substrate is constructed of a flexible material.

10. The subassembly of claim 8 further comprising an integrated circuit chip electrically coupled to said substrate, said integrated circuit chip containing peripheral circuitry for said optoelectronic device.

11. The subassembly of claim 8 wherein said structural frame is constructed of a molded plastic material.

12. The subassembly of claim 8 wherein said optoelectronic device is a semiconductor device.

13. A method of assembling an optical subassembly comprising steps of:

providing a substrate having conductive traces and openings that extend through said substrate;

using molding techniques to flow molding material directly onto said substrate and through said openings and to form said molding material into a preselected shape, thereby fabricating a subassembly body onto said substrate such that said subassembly body extends onto opposite sides of said substrate, including forming said subassembly body to include alignment features for precisely seating optical elements relative to said substrate and said subassembly body; and connecting a light transmitter and a light receiver in fixed positions relative to said substrate, including utilizing said alignment features of said subassembly body to precisely position at least one of said light transmitter and said light receiver.

14. The method of claim 13 wherein said step of using molding techniques includes employing one of transfer molding techniques and injection molding techniques.

15. The method of claim 13 wherein said step of forming said subassembly body to include alignment features includes providing projecting members.

16. The method of claim 13 wherein said step of providing said substrate includes providing a flexible substrate having a plurality of conductive traces.

* * * * *